Dec. 25, 1962   R. A. ELLIOTT   3,069,858
HYDRAULIC DEVICE

Filed Sept. 6, 1960   5 Sheets-Sheet 1

FIG-1

INVENTOR.
ROBERT A. ELLIOTT.
BY John G. Young
ATTORNEY.

FIG_4

FIG_5

INVENTOR.
ROBERT A. ELLIOTT.
BY John A. Young
ATTORNEY.

United States Patent Office 3,069,858
Patented Dec. 25, 1962

1

3,069,858
HYDRAULIC DEVICE
Robert A. Elliott, South Bend, Ind., assignor to The Bendix Corporation, South Bend, Ind., a corporation of Delaware
Filed Sept. 6, 1960, Ser. No. 54,305
6 Claims. (Cl. 60—54.5)

This invention relates to a hydraulic device for automatically adjusting and resetting the brakes in the event that over-adjustment or heating has produced a loss in running clearance of the brake. More particular, the invention relates to the combination of an adjusting-resetting device and a flow limiting means which is so combined with the device that it will in no way interfere with the normal adjusting and resetting functions of the device but will, in the event, of hydraulic failure, prevent more than a predetermined rate of flow through the device as leakage flow.

Heretofore, it has been proposed to meter a fixed quantity of fluid to the brake and thereafter sever further hydraulic communication with the brake, the idea being that if there is a hydraulic failure at the brake then no fluid will be lost from the system beyond a fixed predetermined quantity. Such devices are not only costly, but they add considerable weight to the aircraft and, unless the device is fully charged with hydraulic fluid, an amount of fluid less than this predetermined amount is available for delivery to the brakes in which case the brake may not be fully applied.

Accordingly, it is one of the objects of the present invention, to provide a flow limiting means, which adds negligibly to the weight of the aircraft and which accomplishes the end of safeguarding the system against complete loss of brake fluid by providing a fixed upper limit of hydraulic flow rate through the adjuster and resent device so that even if there should be a complete failure downstream of the device there will not be excessive fluid loss. The upper limit flow rate which is lost from the system is a tolerable loss at its maximum and the maximum flow rate loss is the same regardless of the amount of applying force developed in the system.

A further object of the invention is to provide a novel flow limiting means in combination with the adjuster-reset device which can control the maximum fluid flow rate within sharply defined limits with the maximum limit providing sufficient fluid displacement rate for quick application of the brakes but such rate of flow will not produce an intolerable loss even though the flow represents a leakage flow lost to the system. It is an important advantage of the present invention that a valve structure can be provided to fix within close limits the proper amount of upper limit flow rate which will meet the brake requirements and at the same time not cause excessive fluid losses.

It is a further object of the present invention to provide a flow-limiting means which is combined with an automatic adjuster and reset device which can be readily installed and serviced and is manufacturable at a reasonable cost.

Other objects and features of the present invention will become apparent from a consideration of the following description wherein a plurality of embodiments of the invention are described by way of example. In the drawings:

FIGURE 2 is an enlarged sectional view of the flow-limiting means shown in FIGURE 1;

FIGURE 3 is an exploded view of the flow-limiting means shown in FIGURE 2;

Referring now to the embodiment of FIGURES 1-5 the automatic brake adjuster and reset device designated generally by reference numeral 10 includes an inlet 12 connected through line 14 with a suitable pressure source such as pump or the like 16 and an outlet for 18 connecting through line 20 with an aircraft brake. The device is generally used with aircraft brakes and the specific brake construction does not form a part of the present invention. Also it should be understood that the invention is not limited in usage to aircraft brake systems but is also usable in other systems as well.

The device 10 functions to maintain a constant running clearance for the brakes, and should the brake running clearance be lost because of overheating of the brakes or for any reason, the running clearance can be reestablished by actuating the device by pushing on the brake pedal this procedure serving to actuate the device 10 in a manner resetting the brakes. This result is accomplished through operation of the device 10 as will become clear from a description of the operation of the device.

Figure 1:
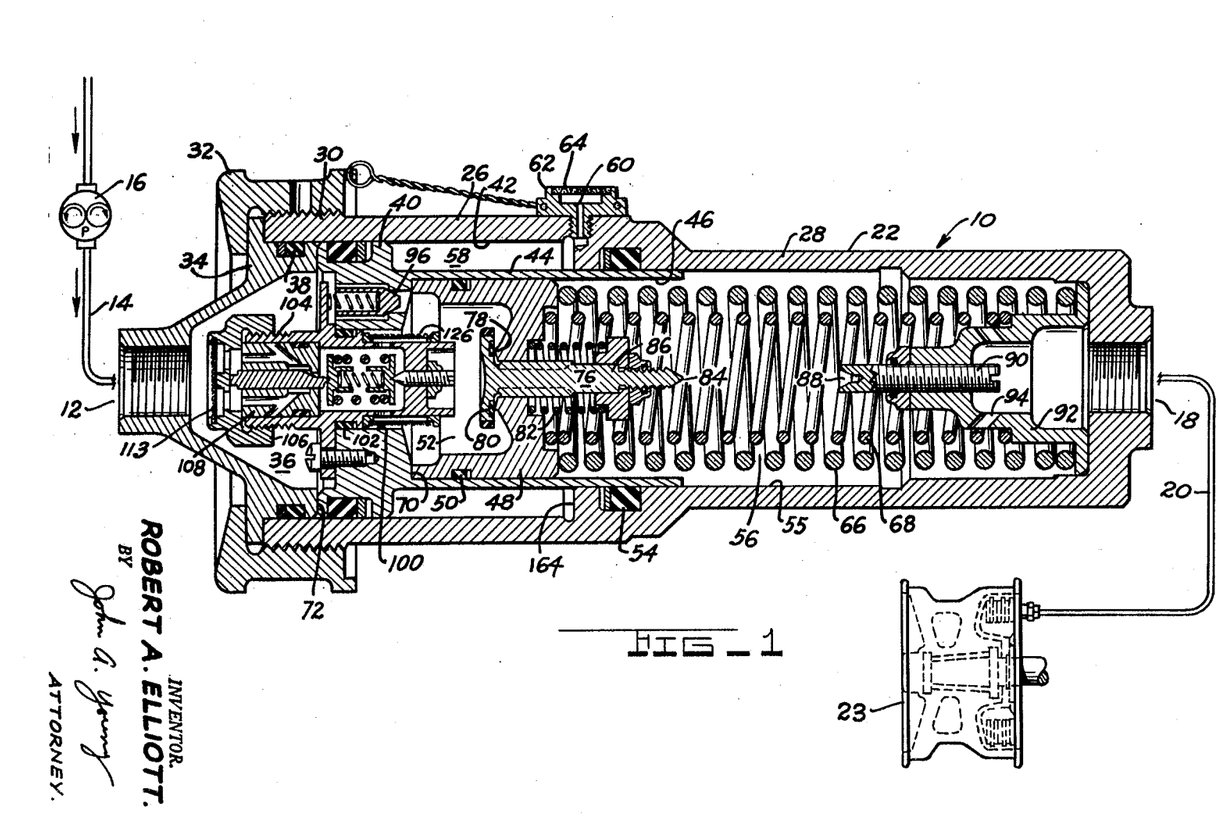
FIGURE 1 is a sectional view of the automatic adjuster and brake reset device taken through the length of the device having the present invention incorporated therein.

The device 10 includes a housing or body 22 having stepped diameter portions 26 and 28 the end 30 of the larger diameter portion 26 being threaded so that cap 32 will clamp an end closure 34 against the larger diameter portion 26. A hydraulic chamber 36 is thereby formed within the housing portion 26 and is sealed by means of an O-ring 38. Piston 40 is slidably mounted within cylinder 42 which forms the interior surface of the portion 26. The piston 40 includes a skirt 44 which defines a cylindrical surface 46 at its inner diameter. A second piston 48 is slidably mounted in cylinder 46 and includes the usual O-ring seal 50 to prevent hydraulic leakage from the intermediate hydraulic chamber 52 past the O-ring seal 50. A second O-ring seal 54 bears against the outer surface of the piston skirt 44 to prevent leakage from the hydraulic cylinder 55 defining chamber 56 which leads to the brakes. The annular chamber 58 provided between the stepped portion 26 of the housing 22 and skirt 44 of piston 40 is vented to atmosphere through passage 60 of plug 62. The screen 64 may be added to prevent entry of dirt or other contaminants.

Two helico springs 66 and 68 bias the piston 48 leftwardly, which in turn bears against shoulder 70 of piston 40 to seat piston 40 against the closure 34 through abutment surface 72. The pistons 40 and 48 are thus disposed normally in the relative positions shown in FIGURE 1 when the brake is released and hydraulic fluid pressure in chamber 36 is relieved.

A poppet valve 76 having a sealing surface 78 is urged against seat 80 by a spring 82 so that communication between chambers 52 and 56 is controlled by the operation of poppet valve 76. As the piston 48 is caused to move toward the right a build up of pressure in chamber 56 can unseat sealing surface 78 from seat 80 to establish communication between chambers 52 and 56 and, the poppet valve can also be unseated by movement of the piston 48 toward the right until end 84 of the valve stem 86 engages the end 88 of a threaded pintle 90 received in mounting structure 92 having openings 94 which provide outlet for the hydraulic fluid within chamber 56 through the outlet port 18 to the brakes.

Between chambers 36 and 52 is a relief port which is controlled by a spring loaded check valve 96, the purpose of the check valve being to relieve pressure in chamber 52 and also in chamber 56 when the pressure in chamber 56 is sufficient to unseat the poppet 76.

Figures 2, 3, 11:
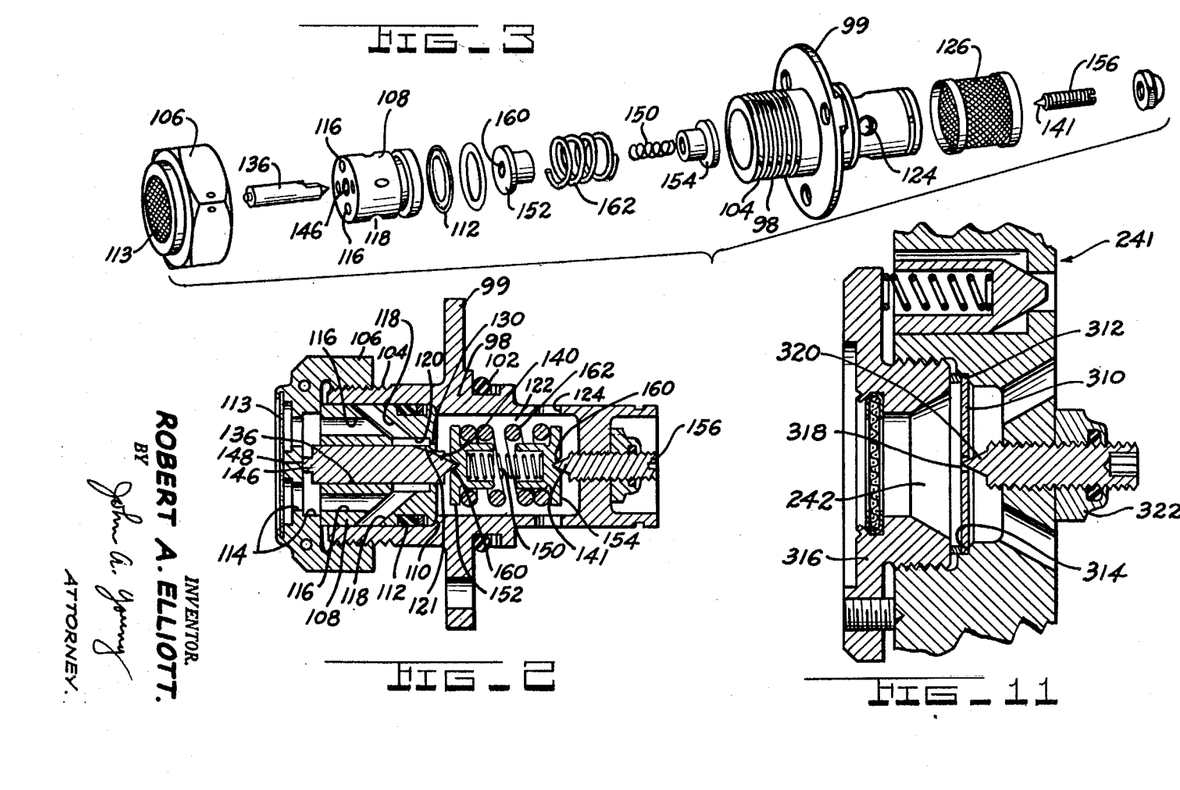

Referring to FIGURE 2, a tubular member 98 having a flange 99 is carried by piston 40 and passes through an opening 100 being sealed by an O-ring seal 102. The tubular member 98 is threaded at 104 to receive a clamping cup 106 pressing bushing 108 against shoulder 110 of the tubular member 98. The bushing is sealed by an O-ring 112. Fluid under pressure within chamber 36 passes through screen 113 and stepped diameter openings 114, through passages 116 and 118 to annular groove 120 and then through metering orifice 121 to chamber 122 where it passes through openings 124, through screen 126 to chamber 52. The metering orifice 121 is defined by a narrow land 130 surrounding the orifice 121 and the effective metering area of the orifice 121 is controlled by a flow limiting valve 136.

The valve 136 (FIGURE 5) has a sloped V-notch 138 contoured in its end 140 and includes a flat 142 and an inclined face 143 which modifies the metering action of the V-notch alone by adding additional metering area at certain locations of the valve 136 within the metering orifice 121. The valve 136 is mounted for reciprocal movement within opening 146 of bushing 108 and it bottoms at its end 148 against closure 106. The total effective metering area developed from both the flat and V-notch is operative to produce the Pressure Drop vs. Flow curve in FIGURE 4 wherein the pressure drop across orifice 121 is plotted against the flow through said orifice for the various positions of the valve 136. The maximum metering area is provided in the retracted position of the valve 136 and the metering area is successively reduced by movement of the valve 136 toward the right by increase of pressure within chamber 36. The total stroke length of the valve 136 during its metering function, is approximately .040 inch.

The valve 136 is urged to its retracted position by means of a light spring 150 which is compressed between two cup shaped members 152 and 154, the cup shaped members being located by means of an adjuster screw 156, both cup shaped members having conical seats 160 which receive the tapered end 140 of the valve 136 and tapered end 141 of screw 156 so that some swiveling action is permitted both cup shaped members 152 and 154. The swiveling action prevents side loading of the valve 136 in the event that the cup shaped members 152, 154 are not precisely aligned with the valve 136. The spring 150 in no way impedes free reciprocal movement of the valve 136 within opening 146 except by its longitudinal biasing effect. The adjuster screw 156 is turned down so that spring 150 will maintain valve 136 seated against closure 106 and will further locate the two cup shaped members 152 and 154 so that heavier helical spring 162 is held lightly therebetween. Thus, as the valve 136 is urged toward the right it immediately encounters the resistance of the heavier spring 162 which may have, typically, a spring rate of about 1250 lbs. per inch. When the valve 136 is in contact with the closure 106 however, the spring 162 is fully relaxed. The described arrangement, is useful in obtaining the small amount of valve movement required in relation to the orifice 121 but without requiring close machining from the stack up of tolerances for retracting the valve 136.

*Operation*

In operation, when the brakes are applied from the fluid pressure source 16 the increase in fluid pressure in chamber 36 forces the piston 40 toward the right (FIGURE 1) urging the piston 48 therewith and thereby the fluid pressure in chamber 56 also increases and is communicated through the outlet port 18 in line 20 to the brakes 23 affecting their application. Assuming the proper brake clearance, initial movement of the piston 40 from its position shown in FIGURE 1 to a position wherein it engages shoulder 164 produces the necessary fluid displacement for taking up brake clearance, a typical stroke length for this purpose being in the order of about 1.37 inches. Just before reaching the shoulder 164 the end 84 of valve stem 86 of the poppet 76 engages end 88 thereby unseating the poppet valve and providing direct communication between chambers 52 and chamber 56 so that the incoming fluid from chamber 36 to chamber 52 through the flow control valve 136 can pass from chamber 36 to chamber 52 and then to chamber 56 to the brake so that the brake can be fully applied under the desired pressure and whatever fluid displacement is required to compensate for wear of the moving parts of the brake.

A total of about 3.14 cubic inches of fluid displacement is involved in taking up brake clearance and this is the amount of fluid displacement in moving the piston 40 from the position shown in FIGURE 1 to the position wherein it engages shoulder 164.

With the piston 40 bottomed on the shoulder 164, any further brake applying force, will transfer fluid across the flow limiting valve 136 at a rate of between 1.4 and 1.6 cu. in. per sec. regardless of differential pressure between chambers 36 and 52 in the range of pressure drop between about 200 and 2000 p.s.i. (see FIGURE 4). This means, that in the event of hydraulic failure downstream of device 10, regardless of the amount of brake applying pressure from pressure source 16, the system, during use will suffer a fluid loss of no greater than between 1.4 and 1.6 in. of fluid per sec. while the brake is being applied. This is an acceptable rate of fluid loss considering the capacity of the fluid reservoir which is normally provided in conjunction with the source of fluid pressure 16.

It is generally arranged that one of the devices 10 is provided for each brake, although, it can be set up that one device 10 is used in conjunction with more than one brake in which case, brake applying pressure is maintained for all of the interconnected brakes and the rate of fluid loss is entirely acceptable. It should be noted that the 1.4 to 1.6 cu. in. per sec. flow rate to the brakes permitted between 200 and 2000 p.s.i. pressure drop, is a sufficient rate of fluid flow to provide quick take-up of the brake clearance and therefore time delay in applying the brake by virtue of operation of the valve 136 is not noticeable.

Figure 4:
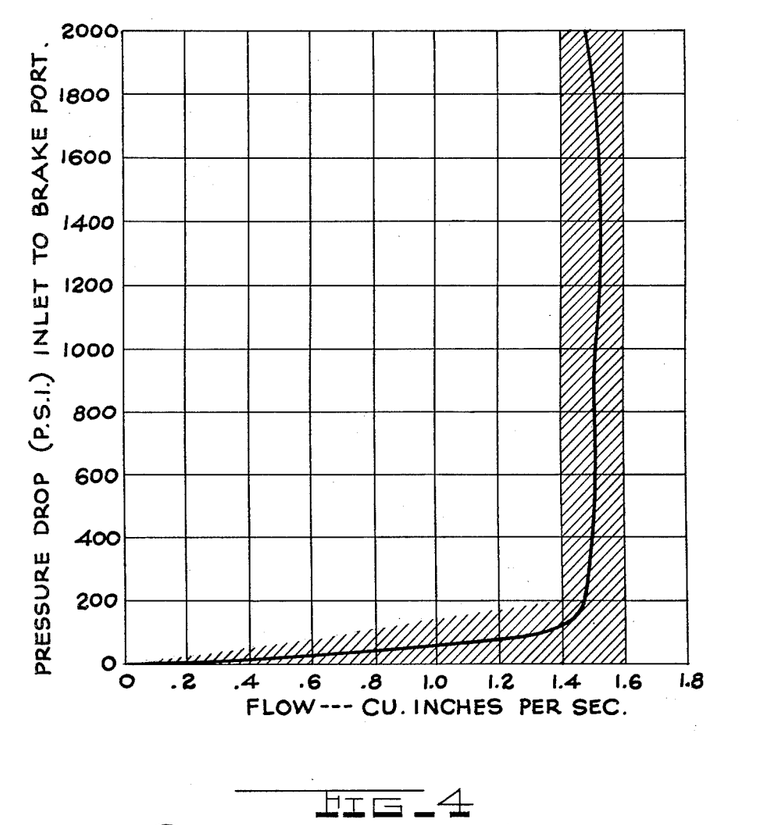
FIGURE 4 is a graph showing the Flow vs. Pressure Drop which accompanies movement of the valve in the flow-limiting means.
Figure 5:
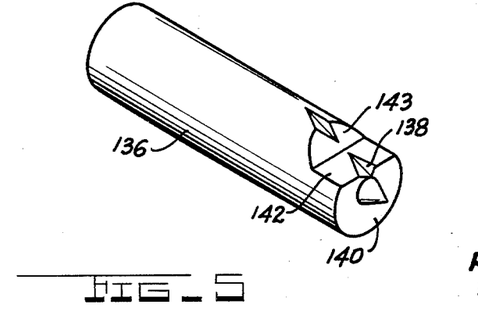
FIGURE 5 is an enlarged isometric view of the valve shown in the embodiment of FIGURES 1-3.

The valve 136, which is responsive to pressure in chamber 36, is displaced toward the right by build up of pressure in chamber 36, so that as differential pressure between chamber 36 and chamber 52 increases, the valve 136 moves farther toward the right against the resistance of spring 162 and such displacement, will successively reduce the effective area of metering orifice 121. While the inclined face portion 143 of the valve is operative to control the orifice 121, the change in area for a given movement of valve 136 is large, producing the substantially horizontal portion of the curve shown in FIGURE 4. As inclined face 143 leaves the orifice, there is an inflection point in the Pressure Drop vs. Flow curve which produces a transition point as the face 143 leaves the metering orifice 121 and is no longer functional. Metering is then controlled solely by the portion of the V-notch shown in FIGURE 5 to the left of inclined face 143. When controlled solely by the V-notch the Pressure Drop vs. Flow curve approaches the vertical as illustrated in FIGURE 4 between 200 and 2,000 p.s.i. Generally, the contemplated operative flow control range of valve 136 extends from the leftmost point of the V-notch as illustrated in FIGURE 5 through a portion of inclined face 143. Flat 142 and the continuation of V-notch 138 are merely to facilitate machining operations.

When the fluid pressure in chamber 36 is relieved the springs 66 and 68 return pistons 40 and 48 to their original position with the poppet valve 76 closing after the first .06 inch of retractible movement; thereafter retractible movement of the two pistons withdraws fluid from the brake in the amount of about 3.14 cu. in. The return springs in the brake follow-up withdrawal of this quantity of fluid, to provide a running clearance in the brake permitted by this quantity of fluid withdrawal. Assuming however that the brake is over-heated and the prescribed quantity of fluid withdrawal is insufficient for complete retraction of the brake, this will be reflected as pressure within chamber 56 and the poppet 76 is designed according to the rate of spring 82 to unseat and bleed some of the pressure from chamber 56 to chamber 52 where it unseats the check valve 96 leading to chamber 36 thence to the reservoir of the fluid pressure source 16.

This happens, only in the instance of an overheated brake and inadvertent setting of the brakes in an applied position, which condition occurs because insufficient fluid is withdrawn from the brake to compensate for a heated and thereby expanded condition of the brake. The running clearance of the brake is reestablished by actuating and releasing the brakes and this resetting is accomplished as follows: Upon actuating and quickly releasing the brakes (which the pilot is instructed to do before landing or taxiing to insure a full release of the brakes) the brake applying pressure in chamber 36 will displace the piston 40 toward the right and if the brake is dragging because brake clearance is lost, input pressure in chamber 36 will displace piston 40 toward the right but before the piston 40 reaches shoulder 164 the rapid build up of pressure in chamber 56 because of the inability of the brake to accept fluid will unseat the poppet 76 and fluid is transferred from chamber 56 to chamber 52 and from chamber 52 to chamber 36 through check valve 96. The piston 40 travels in this fashion until it meets stop 164 and in so doing the piston 48 is likewise displaced toward the right until end 84 contacts stop 88 mechanically unseating the poppet 76. Thereafter, upon release of the pressure in chamber 36 the springs 66 and 68 retract piston 48 and piston 40 until contact is effected between piston 40 and abutment 72 and withdrawing a fixed quantity of brake fluid from the brakes in the order of 3.14 in. of fluid. Since reset has occurred with the brakes in their heated condition sufficient additional fluid is withdrawn so that the brakes are reset with a proper clearance suitable to the heated condition of the brake. Under these circumstances the brake is fully released even though the brakes are in a temporary expanded condition.

The operator is not aware if the brakes require resetting or not but he is instructed to routinely apply the brake and release the brake before landing or taxiing and if reset should be required then the two pistons 40 and 48 will simply be displaced toward the right to effect brake engagement or brake release. Hence, the proper clearance is obtained on pumping the unit.

It will be noted, that adjusting and resetting functions of the device 10 is in no way hampered or reduced in its efficiency because of addition of the flow control valve; the flow control valve functions efficiently although the flow control valve is necessarily operative during both adjusting and resetting of the device 10.

Referring next to the embodiment shown in FIGURES 6–9 the device 209 includes two pistons 210 and 212 which are tandem mounted for reciprocable movement in chambers 214 and 216 respectively and are displaced toward the right in unison until the piston 210 engages its abutment 218 this being the amount of fluid displacement necessary for taking up brake clearance. Movement of the piston 210 from the position where it engages stop 218 to its fully retracted position withdraws fluid to reestablish the proper running clearance. When the brake applying pressure is relieved within chamber 214 following brake application during which fluid is delivered through outlet 220 to the brake, the poppet 222 closes as the return springs 224 and 226 urge piston 212 retractively until piston 210 engages closure 228. During piston retraction a measured amount of fluid is withdrawn from the brake to provide a running clearance for the brakes. Should the brake have worn an amount requiring a fluid displacement over and beyond that provided by movement of the piston 210 from its FIGURE 6 position to a position engaging shoulder 218, then the poppet 222 by virtue of engagement with the pintle 230 unseats the valve 222 and permits whatever additional fluid displacement is required directly from the fluid pressure source (not shown) through the inlet 240, chamber 242, past the flow-limiting valve 244, and chamber 246 into chamber 216. Having taken up all of the running clearance due to wear the proper running clearance is established following brake release even though wear had occurred i.e., when the brake is released the amount of fluid withdrawal which effects the running clearance remains the same regardless of the amount of wear which is taking place during the actual braking stop and regardless of the amount of fluid delivered to the brakes during application. During reset, the pistons 210 and 212 are displaced the same as during a brake application and just as in the previous embodiment. In the event that the brake has been overheated the pistons move in unison until piston 210 moves into engagement with 218 and upon release of the brakes a fixed amount of fluid is withdrawn to provide brake clearance.

It will be seen therefore that brake adjusting and brake resetting functions are essentially the same as in the device previously described. The flow limiting valve 244 however is somewhat different and it comprises a spool 250 having a groove 252 of varying depth formed along the length of land 253. The groove 252 is contoured so that it becomes successively shallower from the extreme right hand end (FIGURES 6, 9) to the left hand end so that as the valve 244 moves toward the right by increasing pressure in chamber 242 greater restriction is made of the metering orifice 260, the extent of rightward movement of the valve 244 being determined by the pressure drop between chamber 214 and chamber 262. Thus, in the event of hydraulic failure downstream of the device 209 the pressure differential between chambers 214 and 262 will increase substantially; but, responsively thereto the flow limiting valve 244 will move toward the right and fix the upper limit of fluid displacement so that fluid lost to the system will be within an acceptable range. Otherwise, an excessive amount of fluid could be lost from the system producing ultimate inoperativeness of the brake applying system.

Figure 9:
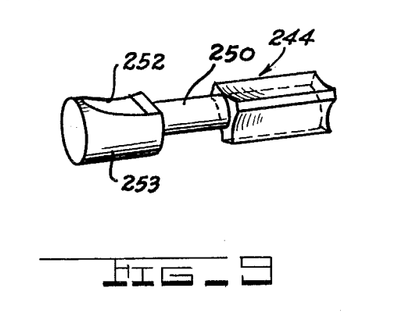
FIGURE 9 is a perspective view of the flow limiting valve provided in the embodiment of FIGURES 6-8.

Referring to FIGURE 9, the groove 252 is contoured so that the Flow vs. Pressure Drop will follow an approximate square law wherein flow will reach a definite limit as the valve is displaced toward the right responsively to increase in pressure drop.

Figure 6:
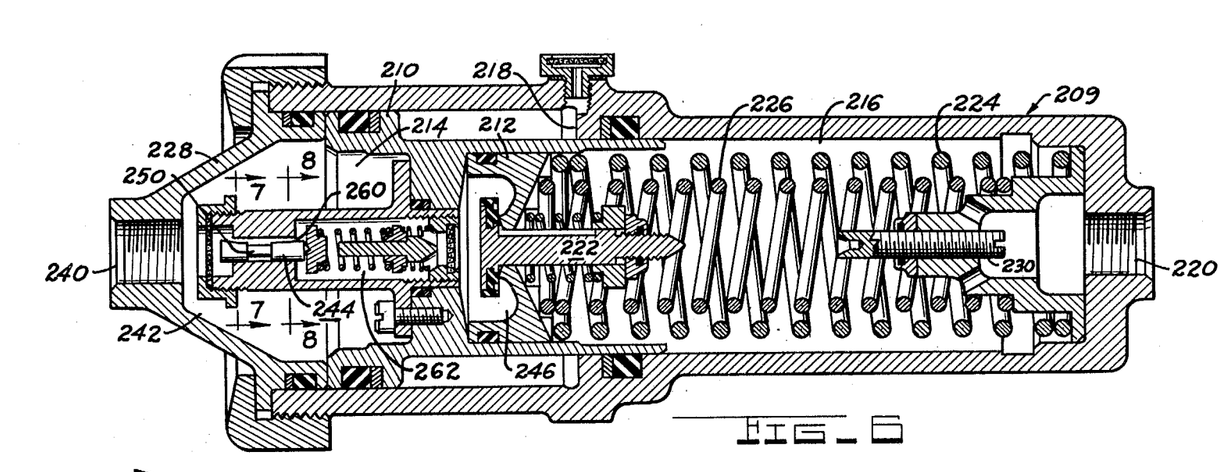
FIGURE 6 is a sectional view of a further embodiment of the invention wherein a different adjuster-and-reset device has incorporated therein a modified flow control valve.
Figure 7:
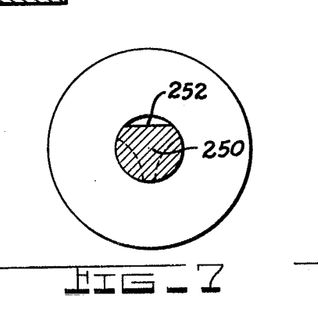
FIGURES 7 and 8 are sectional views taken respectfully on the line 7—7 and 8—8 of FIGURE 6.
Figure 8:
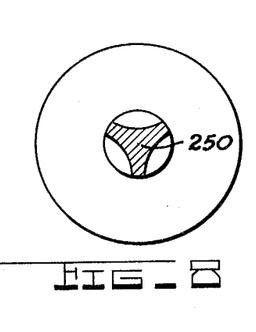

In this embodiment as in the preceding embodiment, the flow limiting valve in no way interferes with the adjusting and resetting function of the device 209 but does contribute the valuable function of prohibiting fluid loss in excess of an acceptable amount should a hydraulic failure occur.

Figure 10:
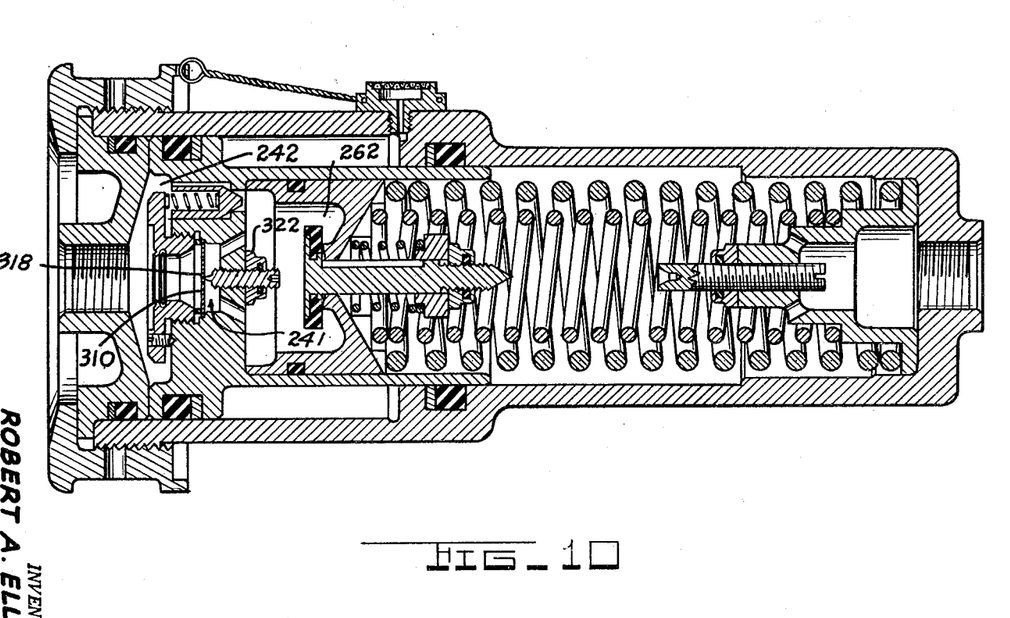
FIGURE 10 is a sectional view of a further embodiment of the invention showing a different combination adjuster-and-reset device having another species of the flow limiting valve; and, FIGURE 11 is an enlarged detail sectional view of the flow limiting valve species shown in FIGURE 10.

Referring next to the embodiment shown in FIGURES 10 and 11, the automatic adjuster and reset device is essentially the same as that shown in the previous embodiment FIGURES 6–9 the flow limiting valve 241 however which is disposed between chambers 242 and chamber 262 comprises a flexible diaphram 310 which is clamped at its outer periphery 312 between a shoulder 314 and a ring nut 316. At the middle of the diaphragm is an orifice 318 into which extends a conical section 320 of a threaded stem 322. The flexible diaphragm 310 can be distorted from a flat shape to a frusto-conical shape by an increase of pressure drop between chambers 242 and 262 and as it assumes a frusto-conical shape the metering orifice 318 is biased toward the larger diameter end of the conical section 320 and in so doing reduces the metering area of the orifice 318 as defined by the conical section 320. Thus, an increase of pressure drop between chambers 242 and 262 will reduce the fluid flow across orifice 318 in accordance with the general relationship that the fluid flow is inversely proportional to pressure drop rather than following a proportional relationship which is related to the square root of the pressure drop by a linear function. In the present case, this is modified so that flow is not so related to the square root of the pressure drop and will reach a maximum value which is within an acceptable rate of loss to the system.

In this embodiment, the conical section is contoured to provide a specific flow characteristic. It is provided that there is always some limited flow, and toward this end stops may be added to prevent bottoming out of the flexible diaphragm on the conical section 320. This is not necessary however because the diaphragm 310 can be designed to have a spring rate such that it will not bottom out at the working pressure of the system.

The automatic adjuster and reset device operates substantially the same as those described in the previous embodiments and these functions of the device are not noticeably affected by the flow limiting means. The flow limiting means will however prevent excessive rate of fluid loss in the event of the hydraulic failure downstream of the device and will limit such loss to an acceptable value without draining the entire system of hydraulic fluid.

Although only three selected embodiments of the invention have been chosen to illustrate the invention, it will be understood that these are not limitative of the invention. It is expected that those skilled in the art can make numerous revisions and adaptations of the invention to suit individual design requirements and it is therefore intended that such revisions and variations as incorporate the herein disclosed principles, will be included within the scope of the following claims as equivalents of the invention.

What is claimed is:

1. In a hydraulically actuated brake, a combination brake adjuster and reset mechanism comprising housing means defining a hollow stepped diameter cylinder, differential area piston means slidably disposed within said housing and operative therewith to define first and second variable volume chambers at opposed ends of said housing, said second chamber including resilient means urging said piston in one direction of movement, said first variable volume chamber having a larger diameter than said second variable volume chamber, said piston means including interior passage means formed therethrough interconnecting said first and second variable volume chambers, fluid supply means operative to supply a brake actuating fluid to said first variable volume chamber, an outlet port leading from said second variable volume chamber to the brake, means defining two fixed stops which are spaced apart to define the limits of movement for said piston means, a poppet valve arranged in said interior passage means to control fluid flow therethrough, a spring member urging said poppet valve in a normally closed direction, said poppet valve further arranged to be urged in a closed direction by fluid pressure forces on the first chamber side thereof and urged in an open direction by fluid pressure forces on the second chamber side thereof, and flow limiting means arranged in said interior passage in series with said poppet valve operative to limit the maximum flow rate through said interior passage.

2. In a hydraulically actuated brake, a combination brake adjuster and reset mechanism as claimed in claim 1 including a spring loaded check valve arranged in parallel flow relationship with said flow limiting means operative to permit reverse flow into said first variable volume chamber.

3. In a hydraulically actuated brake, a combination brake adjuster and reset mechanism as claimed in claim 1 including a pintle projecting into said second chamber in axial alignment with said poppet valve operative to unseat said poppet valve at the end of the stroke of said piston means.

4. A combination brake adjuster and reset mechanism comprising housing means having a hollow interior, a differential area piston member slidably disposed in said housing means and operative therewith to define a first and second variable volume chamber at opposite ends thereof, passage means extending through said piston member to interconnect said variable volume chambers, said first chamber having an inlet for admitting hydraulic fluid for brake application, said second chamber having an outlet communicating with the brakes, valve means controlling communication between said chambers and responsive to the pressure differential therebetween to provide fluid transfer between said chambers, means for opening said valve means at a preselected protractile position of said piston member to provide fluid access between said chambers, means for closing said valve means during retractile movement of said piston member, means for limiting the retracting travel of said piston member to a predetermined amount to withdraw a fixed quantity of fluid from the brake and thereby determine its running clearance, flow control means disposed in said passage means to provide a controlled leakage between said chambers responsively to a downstream hydraulic failure.

5. A combination brake adjuster and reset mechanism comprising housing means having a hollow interior, a differential area piston member slidably disposed in said housing means and operative therewith to define first and second variable evolume chambers at opposed ends thereof, said first chamber having a larger cross sectional area than said second chamber, a fluid pressure source connected to said first chamber, said second chamber adapted to be connected to the brakes, said differential area piston having a large surface area on one side thereof forming one wall of said first variable volume chamber and a smaller surface area on the other side thereof forming one wall of said second variable volume chamber, said differential area piston further having an annular area on said other side vented to the atmosphere, passage means contained in said piston interconnecting said first and second chambers, a poppet valve contained in said passage means to control the fluid communication therethrough in response to the respective pressures in said chambers to be opened thereby when the brake pressure is in excess of a predetermined amount, means for opening said poppet valve when said piston is moved a predetermined amount in a brake applying direction, means for closing said poppet valve when said piston is moved in a brake release direction, and a flow limiting means disposed in said passage means comprising a metering orifice and a movable valve member having a contoured outer periphery controlling the effective area of said orifice, said metering valve being movable in response to the difference in pressure between said chambers and operative to limit the maximum flow rate.

6. A combination brake adjuster and reset mechanism in accordance with claim 5 wherein said movable valve member comprises a spool having a progressively shallower notch movable within said orifice to reduce the effective area as the pressure difference increases.

References Cited in the file of this patent
UNITED STATES PATENTS

| | | |
|---|---|---|
| 870,806 | Turner | Nov. 12, 1907 |
| 1,065,220 | Clay | June 17, 1913 |
| 2,926,499 | Oswalt | Mar. 1, 1960 |
| 2,972,865 | Orshansky | Feb. 28, 1961 |

UNITED STATES PATENT OFFICE
CERTIFICATE OF CORRECTION

Patent No. 3,069,858                        December 25, 1962

Robert A. Elliott

It is hereby certified that error appears in the above numbered patent requiring correction and that the said Letters Patent should read as corrected below.

Column 5, line 30, for "retractible", both occurrences, read -- retractile --; column 8, line 59, for "evolume" read -- volume --.

Signed and sealed this 20th day of August 1963.

(SEAL)
Attest:

ERNEST W. SWIDER                        DAVID L. LADD
Attesting Officer                           Commissioner of Patents